(12) United States Patent
Shin et al.

(10) Patent No.: US 9,961,509 B2
(45) Date of Patent: May 1, 2018

(54) BASE STATION AND A PLURALITY OF MEMBER NODES FOR TRANSMITTING AND RECEIVING NETWORK CODING BASED MULTICAST TRAFFIC

(71) Applicant: SAMSUNG ELECTRONICS CO., LTD., Suwon-si (KR)

(72) Inventors: Won Jae Shin, Seoul (KR); Jong Bu Lim, Yongin-si (KR); Kyung Hun Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 630 days.

(21) Appl. No.: 14/079,934

(22) Filed: Nov. 14, 2013

(65) Prior Publication Data

US 2014/0133382 A1 May 15, 2014

Related U.S. Application Data

(60) Provisional application No. 61/726,135, filed on Nov. 14, 2012.

(30) Foreign Application Priority Data

Apr. 10, 2013 (KR) .................. 10-2013-0039258

(51) Int. Cl.
*H04W 4/06* (2009.01)
(52) U.S. Cl.
CPC .................... *H04W 4/06* (2013.01)
(58) Field of Classification Search
CPC ....... H04W 4/06; H04W 28/04; H04W 40/00; H04L 1/16; H04L 1/18; H04L 1/08; H04L 12/56
See application file for complete search history.

(56) References Cited

U.S. PATENT DOCUMENTS

| | | | |
|---|---|---|---|
| 2010/0153807 A1* | 6/2010 | Kakani | H04L 12/1863 714/749 |
| 2011/0051729 A1 | 3/2011 | Wei et al. | |
| 2011/0069653 A1 | 3/2011 | Wang et al. | |
| 2011/0116435 A1 | 5/2011 | Liu et al. | |
| 2012/0044815 A1 | 2/2012 | Geirhofer et al. | |
| 2012/0188934 A1* | 7/2012 | Liu | H04L 12/1863 370/312 |
| 2012/0239997 A1 | 9/2012 | Otsuki et al. | |

FOREIGN PATENT DOCUMENTS

| | | | | |
|---|---|---|---|---|
| WO | 2011/113200 A1 | 9/2011 | | |
| WO | WO 2011113200 A1 * | 9/2011 | ........... | H04L 1/1887 |

OTHER PUBLICATIONS

International Search Report for PCT/KR2013/009892 dated Feb. 24, 2014 [PCT/ISA/210].

* cited by examiner

*Primary Examiner* — Lakeram Jangbahadur
(74) *Attorney, Agent, or Firm* — Sughrue Mion, PLLC

(57) ABSTRACT

Provided are a base station and a plurality of member nodes for transmitting and receiving network coding based multicast traffic. The base station may transmit multicast traffic, and the member node may transmit an acknowledgement (ACK) signal based on received multicast traffic. A determination made be made as to whether the multicast traffic is to be retransmitted, based on a number of member nodes transmitting ACK signals.

22 Claims, 9 Drawing Sheets

BASE STATION AND A PLURALITY OF MEMBER NODES FOR TRANSMITTING AND RECEIVING NETWORK CODING BASED MULTICAST TRAFFIC

CROSS-REFERENCE TO RELATED APPLICATIONS

This application claims priority from U.S. Provisional Application No. 61/726,135, filed on Nov. 14, 2012, in the U.S. Patent and Trade Mark Office, and Korean Patent Application No. 10-2013-0039258, filed on Apr. 10, 2013, in the Korean intellectual Property Office, the entire disclosures of Which are incorporated herein by reference.

BACKGROUND

1. Field

Methods and apparatuses consistent with exemplary embodiments relate to a base station and a plurality of member nodes for transmitting and receiving network coding based multicast traffic.

2. Description of the Related Art

With a rapid increase in a number of various wireless devices including smart phones, tablet personal computers (PCs), and the like, and related applications, a sharp increase can be found in wireless data traffic. Such a phenomena may further accelerate. Additionally, a demand for a multicast service, in which at least one transmitter transmits data to at least one predetermined receiver, is expected to increase.

In order to process data for video, audio, and collaborative paperwork or document transmission between groups, there is a demand for a multicast protocol that may guarantee reliability, despite a potential delay in time. However, in order to guarantee reliability in multicast transmission, lost packets may need to be retransmitted.

SUMMARY

One or more exemplary embodiments provide a base station for transmitting multicast traffic to a plurality of member nodes belonging to a multicast group.

According to an aspect of an exemplary embodiment, there is provided a base station including a packet transmitter configured to transmit a multicast packet to a plurality of member nodes of member nodes belonging to a multicast group, an acknowledgement (ACK) signal receiver configured to receive at least one ACK signal transmitted from at least one of the plurality of member nodes, and a retransmission determiner configured to determine whether the multicast packet is to be retransmitted, based on the at least one ACK signal.

The multicast packet may include a plurality of network coded packets generated by network coding a plurality of data packets, and wherein the retransmission determiner is further configured to determine whether the multicast packet is to be retransmitted based on the at least one ACK signal and an operating mode corresponding to a type of the at least one ACK signal.

The retransmission determiner may include an ACK signal counter configured to count a number of ACK signals that are received, and a retransmission decision unit configured to compare the number of ACK signals with a number of the plurality of member nodes in response to a type of the ACK signals corresponding to a complete ACK type, and decide the multicast packet is to be retransmitted in response to a result of the comparing, wherein the result of the comparing shows the number of the ACK signals being less than the number of the plurality of member nodes.

The retransmission determiner may include an ACK signal counter configured to count a received number of ACK signals, and a retransmission decision unit configured to decide the multicast packet is to be retransmitted in response to at least one of the received number of ACK signals being a type of ACK signal that corresponds to a complete negative acknowledgement (NACK) type.

The retransmission determiner may include an energy detector configured to determine whether the at least one ACK signal is present, and a retransmission decision unit configured to decide the multicast packet is to be retransmitted in response to a determination that the at least one ACK signal is present and a type of the at least one ACK signal corresponds to a complete NACK type.

The base station may further include a retransmission packet determiner configured to determine a subset of the plurality of network coded packets to be retransmitted in response to a determination that the multicast packet is to be retransmitted, and a retransmission packet generator configured to generate a retransmission packet comprising the subset of the plurality of network coded packets. Here, the packet transmitter may be further configured to transmit the retransmission packet to the plurality of member nodes.

The retransmission packet determiner may determine the subset based on the at least one ACK signal and a number of retransmissions.

The retransmission determiner may include a number of retransmissions counter configured to count a number of retransmissions with respect to the multicast packet, and a retransmission decision unit configured to decide the multicast packet is not to be retransmitted when the number of retransmissions reaches a predetermined maximum number of retransmissions.

The ACK signal receiver may be configured to be in a receptive state for the at least one ACK signal fir a predetermined time period after the multicast packet is transmitted. Here, the predetermined time period may be known by the base station and the plurality of member nodes.

The base station may further include a codebook storage unit configured to store a codebook shared with the plurality of member nodes. Here, the packet transmitter may include a network coding unit configured to network code the plurality of data packets using a plurality of code words included in the codebook to generate the plurality of network coded packets, and a packet generator configured to generate the multicast packet including the plurality of network coded packets and a codebook index corresponding to the plurality of code words.

According to an aspect of another exemplary embodiment, there is provided a member node for receiving multicast traffic from a base station, the member node including a packet receiver configured to receive a multicast packet from the base station, a successful reception determiner configured to determine whether the multicast packet is successfully received, and an ACK signal transmitter configured to transmit an ACK signal to the base station, based on a result of the determining by the successful reception determiner and an operating mode corresponding to a type of the ACK signal.

The ACK signal transmitter may include an ACK signal generator further configured to generate the ACK signal of a complete ACK type, in response to a determination that the multicast packet is successfully received, when a type of the ACK signal corresponds to the complete ACK type.

The ACK signal transmit r may include an overhearing unit configured to overhear ACK signals transmitted to the base station from a plurality of member nodes included in a multicast group, when a type of the ACK signals corresponds to a complete negative acknowledgement (NACK) type, and an ACK signal generator configured to generate an ACK signal of the complete NACK type, in response a determination that an overheard ACK signal is absent and a determination that the multicast packet is not successfully received.

The packet receiver may include a retransmission packet receiver configured to receive a packet retransmitted from the base station. Here, the multicast packet may include a plurality of network coded packets generated by network coding a plurality of data packets. The successful reception determiner may be further configured to determine whether the plurality of data packets are successfully received, based on the retransmitted packet and network coded packets being successfully received from among those originally included in the multicast packet including the plurality of network coded packets.

The member made may further include a codebook storage unit configured to store a codebook shared with the base station and a plurality of member nodes included in a multicast group. Here, the successful reception determiner may include a codebook index extractor configured to extract a codebook index from the multicast packet, and a decoder configured to decode the plurality of network coded packets included in the multicast packet, using code words corresponding to the extracted codebook index, among a plurality of code words included in the codebook.

According to an aspect of another exemplary embodiment, there is provided a base station for transmitting multicast traffic to a plurality of member modes belonging to a multicast group, the base station including a codebook storage unit configured to store a codebook shared with the plurality of member nodes, a network coding unit configured to network code as plurality of data packets using a plurality of code words included in the codebook to generate a plurality of network coded packets, a packet generator configured to generate a multicast packet including the plurality of network coded packets and a codebook index corresponding to the plurality of code words, and a packet transmitter configured to transmit the multicast packet to the plurality of member nodes.

The base station may further include an ACK signal receiver configured to receive at least one ACK signal of a complete ACK type transmitted from at least one of the plurality of member nodes, an ACK signal counter configured to count a received number of ACK signals, and a retransmission determiner configured to determine whether the multicast packet is to be retransmitted, by comparing the received number of ACK signals to a number of the plurality of member nodes.

The base station may further include an ACK signal receiver configured to receive at least one ACK signal of a complete NACK type transmitted from at least one of the plurality of member nodes, an ACK signal detector configured to verify whether the ACK signal is present, and a retransmission determiner configured to determine whether the plurality of data packets is to be retransmitted, depending on whether the ACK signal is present.

According to an aspect of another exemplary embodiment, there is provided a member node for receiving multicast traffic from a base station, the member node including a codebook storage unit configured to store a codebook shared with the base station and a plurality of member nodes included in a multicast group, a packet receiver configured to receive a multicast packet from the base station, a codebook index extractor configured to extract a codebook index from the multicast packet, and a decoder configured to decode a plurality of network coded packets included in the multicast packet, using code words corresponding to the codebook index, among a plurality of code words included in the codebook.

The member node may further include a successful reception determiner configured to determine Whether the multicast packet is successfully received, an ACK signal generator configured to generate an ACK signal of a complete ACK type, in response to a determination that the multicast packet is successfully received, and an ACK signal transmitter configured to transmit the ACK signal of the complete ACK type to the base station.

The member node may further include a successful reception determiner configured to determine whether the multicast packet is successfully received, an overhearing unit configured to overhear ACK signals of a complete NACK type transmitted from the plurality of member nodes to the base station, an ACK signal generator configured to generate an ACK signal of the complete NACK type, in response to a determination that an overheard ACK signal is absent and a determination that the multicast packet is not successfully received, and an ACK signal transmitter configured to transmit the generated ACK signal of the complete NACK type to the base station.

BRIEF DESCRIPTION OF THE DRAWINGS

The above and other aspects of example embodiments will become apparent and more readily appreciated from the following detailed description of certain example embodiments, taken in conjunction with the accompanying drawings of which.

DETAILED DESCRIPTION

Figure 1:
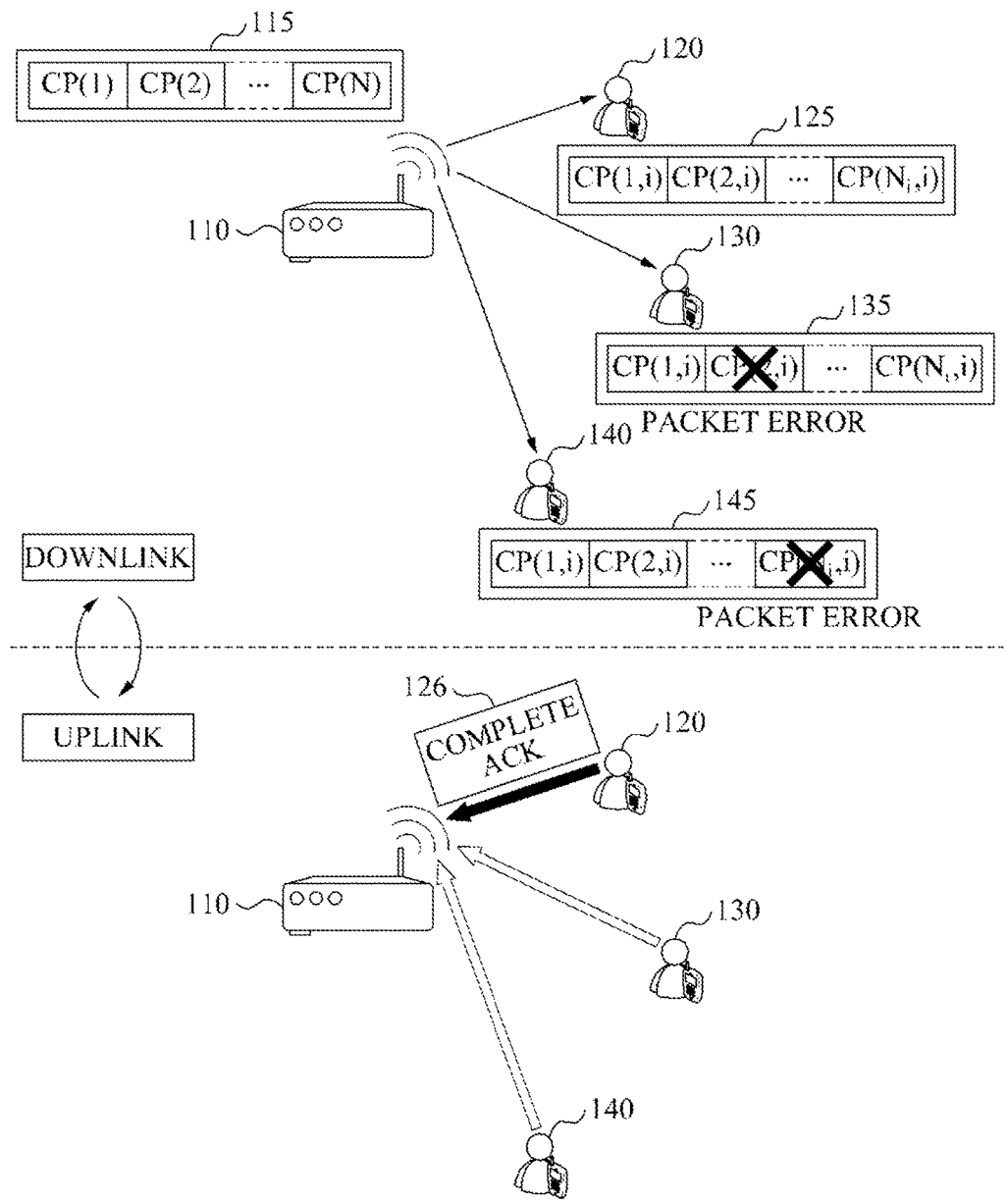
FIG. 1 is a diagram illustrating member nodes and a base station that may determine whether a multicast packet is to be retransmitted, using an acknowledgement (ACK) signal of a complete ACK type according to one or more exemplary embodiments.

Reference will now be made in detail to example embodiments, examples of which are illustrated in the accompanying drawings, wherein like reference numerals refer to the like elements throughout. Exemplary embodiments are described below in order to explain the present disclosure while also referencing to the figures for support.

FIG. 1 is a diagram illustrating member nodes 120, 130, and 140 and a base station 110 that may determine whether a multicast packet is to be retransmitted, using an acknowledgement (ACK) signal of a complete ACK type according to example embodiments.

Referring to FIG. 1, the base station 110 may transmit a multicast packet to the plurality of member nodes 120, 130, and 140 included in a multicast group.

Herein, the base station 110 may refer to an apparatus for transmitting multicast packets, and may include, for example, an access point (AP), and the like. Each of the plurality of member nodes 120, 130, and 140 may refer to an apparatus for receiving identical multicast packets, and may include, for example, a smart phone, a tablet personal computer (PC), a laptop computer, and the like.

In this exemplary embodiment, the base station 110 may generate a multicast packet 115 by using a network coding technique, and the plurality of member nodes 120, 130, and 140 may decode the received multicast packets 125, 135 and 145, respectively, by using decoding technique corresponding to the network coding technique.

The base station 110 may transmit a plurality of data packets to the plurality of member nodes 120, 130, and 140 which are included in the multicast group. The base station 110 may generate a plurality of network coded packets by network coding the plurality of data packets, and may transmit a multicast packet including the plurality of network coded packets to the plurality of member nodes 120, 130, and 140.

Additionally, according to an exemplary embodiment, the multicast packets 125, 135, and 145 received by the plurality of member nodes 120, 130, and 140 may include a packet error.

For example, the multicast packet 135 received by the member node 130 may include a packet error in a location where a second network coded packet is located within the multicast packet 135, and the multicast packet 145 received by the member node 140 may include a packet error in a location where a last network coded packet is located within the multicast packet 145.

In this example, the member node 130 and the member node 140 may need to receive new network coded packets corresponding to a number of network coded packets that included a packet error, in order to receive the plurality of data packets transmitted by the base station 110.

According to at least one of the present embodiments, the base station 110, and the plurality of member nodes 120, 130, and 140, may use an ACK signal of a complete ACK type, hereinafter, referred to as a complete ACK signal.

Each of the plurality of member lodes 120, 130, and 140 may determine whether all N network coded packets are successfully received. Here, N denotes a number of the network coded packets transmitted by the base station 110.

Each of the plurality of member nodes 120, 130, and 140 may feedback a complete ACK signal to the base station 110, when all of the N network coded packets are successfully received.

For example, because the member node 120 receives all network coded packets successfully, without a packet error, the member node 120 may generate a complete ACK signal 126, and transmit the complete ACK signal 126 to the base station 110.

Further, each of the member node 130 and the member node 140 may detect a packet error included in the received multicast packet, and may therefore not transmit a complete ACK signal.

According to one or more exemplary embodiments, a member node may determine whether a complete ACK signal is to be transmitted, using a predetermined threshold value. For example, the member node may transmit a complete ACK signal to a base station when a reception rate of network coded packets is greater than or equal to the predetermined threshold value.

The complete ACK signal generated by the member node may include 1 bit. For example, the complete ACK signal generated by the member node may be used to transmit a single feedback with respect to the entire multicast packet to the base station, rather than to transmit respective feedback with respect to the received network coded packets to the base station.

Accordingly, the base station and the plurality of member nodes according to the present embodiments may provide technology for minimizing the occurrence of traffic overhead due to feedback signals transmitted for recognizing a situation requiring retransmission through the transmission of network coding based multicast traffic.

For example, a configuration in which a complete ACK signal is used may be applied to a wireless local area network (WLAN) system for distributed multiple access. In this example, all user terminals may not transmit, to a wireless AP, information regarding whether packets are successfully received, each time. Instead, only a user terminal successfully receiving all packets may transmit a complete ACK signal to the AP.

Figure 2:
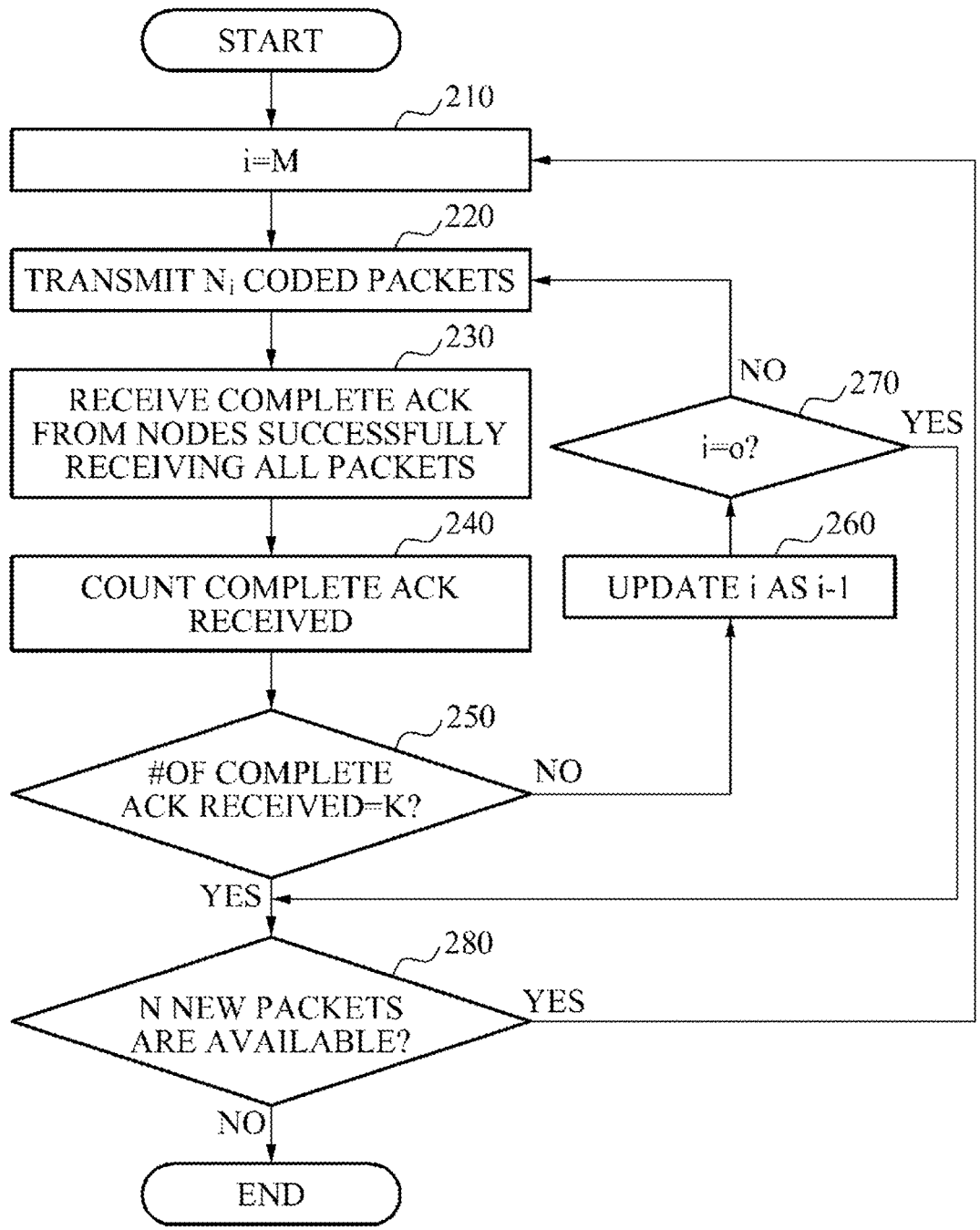
FIG. 2 is a flowchart illustrating an operating method of a base station determining Whether a multicast packet is to be retransmitted, using an ACK signal of a complete ACK type according to one or more exemplary embodiments.

FIG. 2 is a flowchart illustrating an operating method of a base station for determining whether a multicast packet is to be retransmitted using an ACK signal of a complete ACK type according to one or more exemplary embodiments.

Referring to FIG. 2, the base station may receive complete ACK signals from a plurality of member nodes, and may determine whether the multicast packet is to be retransmitted, based on a number of the received complete ACK signals.

In this instance, the base station may set a number of network coded packets to be included in a retransmission packet to a constant, or may reduce a number of network coded packets to be included in the retransmission packet as a number of retransmissions increases.

In particular, in operation 210, the base station may designate a transmission index i as a maximum number M of retransmissions, when N data packets to be transmitted to K member nodes are available.

In operation 220, the base station may generate $N_i$ network coded packets by network coding the N data packets, and may transmit a multicast packet including the $N_i$ network coded packets to the K member nodes.

Here, $N_M$ denotes a number of network coded packets for an initial transmission of the N data packets, and $N_M=N$. As another example, $N_M$ may be calculated by $\alpha \times N (0<\alpha\leq 1)$.

Each of the K member nodes may receive the multicast packet transmitted from the base station, and may provide feedback of a complete ACK signal to the base station when it is determined that a packet error is absent. In operation 230, the base station may receive complete ACK signals. In operation 240, the base station may count a number of the received ACK signals.

In operation 250, the base station may determine whether the number of the received complete ACK signals corresponds to K, the number of the member nodes included in the multicast group. The base station may compare the number of the received complete ACK signals to the number of the member nodes included in the multicast group, and determine that the multicast packet is to be retransmitted, in response to a determination that the number of the received complete ACK signals is less than the number of the member nodes included in the multicast group, as a result of the comparing.

In response to a determination that the number of the received complete ACK signals does not correspond to K, the number of the member nodes included in the multicast group, the base station may reduce the transmission index i by "1", in operation 260, and determine whether the transmission index i corresponds to "0", in operation 270.

In response to a determination that the transmission index i does not correspond to "0", the base station may return to operation 220 to perform the retransmission procedure. For example, the base station may repeat operations 220 through 250; using the transmission index i reduced by "1" in operation 260.

In this instance, the base station may generate $N_i$ data packets by network coding the N data packets, and transmit a retransmission packet including the $N_i$ network coded packets to the K member nodes.

Here, $N_i$ may be determined by various schemes. As an example, $N_i$ may be calculated by $\alpha \times N (0<\alpha\leq 1)$, irrespective of the transmission index i.

In another exemplary embodiment, $N_i$ may be reduced as a number of retransmissions increases, in particular, as the transmission index i decreases. For example, when the maximum number M of retransmissions corresponds to "3", $N_i$ may be determined to be $N_3=10$, $N_2=5$, $N_1=3$, and the like.

According to another exemplary embodiment, $N_i$ may be determined based on the number of the received complete ACK signals. For example, when a relatively great number of complete ACK signals are received, $N_i$ may be determined to be a value less than $N_i$ for a case in which a relatively small number of complete ACK signals are received.

Each of the K member nodes may determine whether the N network coded packets are received, based on the previously received multicast packet and a newly received retransmission packet. Each of the K member nodes may transmit feedback that provides a complete ACK signal to the base station, in response to a determination that the N network coded packets are successfully received.

In response to a determination in operation 250 that the number of the received complete ACK signals corresponds to K, which represents the number of the member nodes included in the multicast group, the base station may proceed to operation 280 to transmit subsequent N data packets.

In operation 280, the base station may determine whether the subsequent N data packets are available. When the subsequent N data packets are available, the base station may return to operation 210 to repeat operations 210 through 280.

When the transmission index i reaches "0" in operation 270, the base station may determine that the retransmission has been performed M number of times corresponding to the maximum number of retransmissions, and proceed to operation 280 to transmit the subsequent N data packets.

Figure 3:
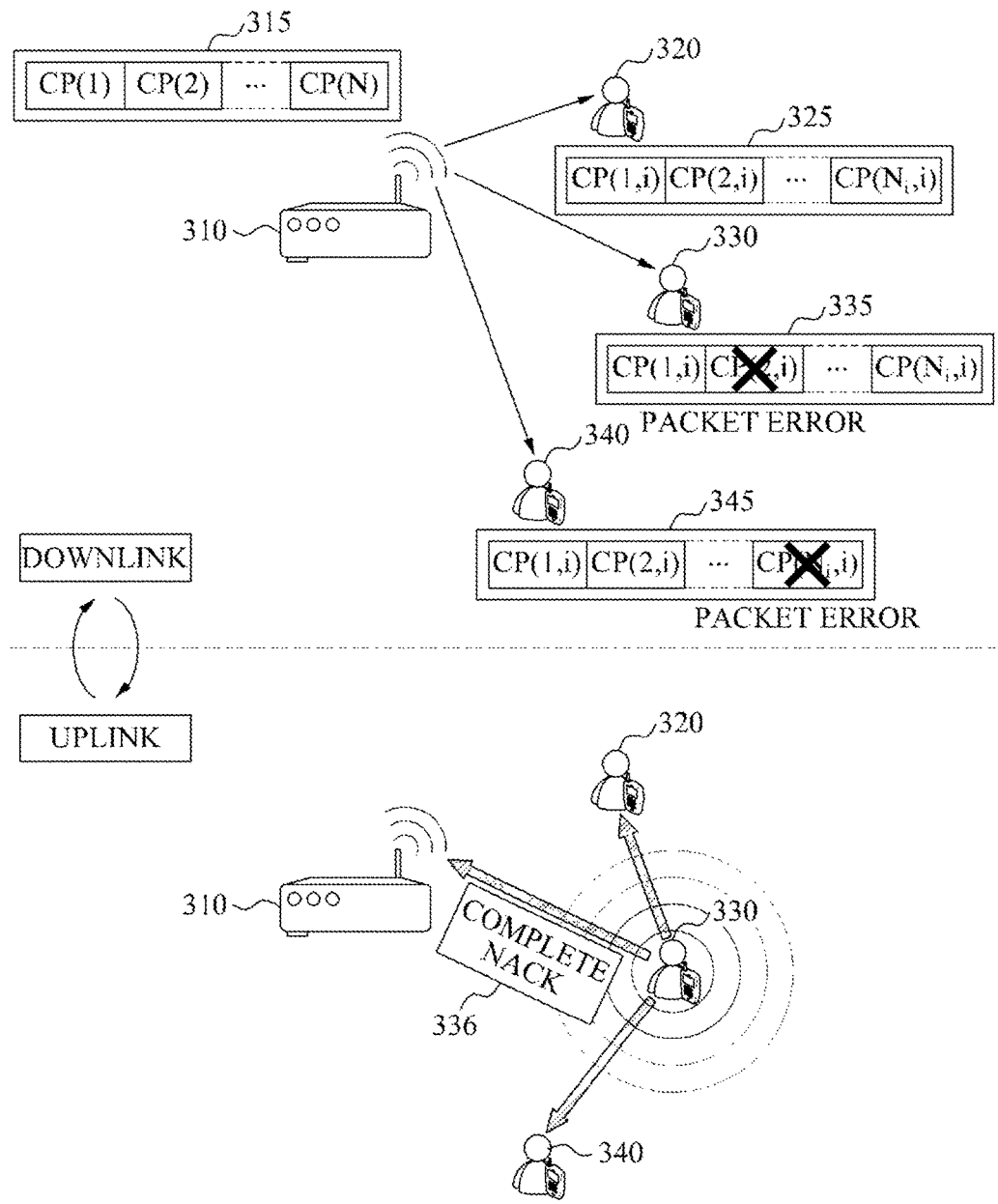
FIG. 3 is a diagram illustrating member nodes and a base station that may determine whether multicast packet is to be retransmitted, using an ACK signal of a complete negative acknowledgement (NACK) type according to one or more exemplary embodiments.

FIG. 3 is a diagram illustrating member nodes 320, 330, and 340 and a base station 310 that may determine whether a multicast packet is to be retransmitted using an ACK signal of a complete negative acknowledgement (NACK) type, according to one or more exemplary embodiments.

Referring FIG. 3, the base station 310 may transmit a multicast packet to the plurality of member nodes 320, 330, and 340 included in a multicast group.

The base station 310 may generate and transmit a multicast packet 315 using a network coding technique, and the plurality of member nodes 320, 330, and 340 may decode received multicast packets 325, 335, and 345, respectively, using a decoding technique corresponding to the network coding technique.

The base station 310 may transmit a plurality of data packets to the plurality of member nodes 320, 330, and 340 which are included in the multicast group. The base station 310 may generate a plurality of network coded packets by network coding the plurality of data packets, and may transmit a multicast packet including the plurality of network coded packets to the plurality of member nodes 320, 330, and 340.

Additionally, according to an exemplary embodiment, the multicast packets 325, 335, and 345 received by the plurality of member nodes 320, 330, and 340 may include a packet error.

For example, the multicast packet 335 received by the member node 330 may include a packet error in a location where a second network coded packet is located within the multicast packet 335, and the multicast packet 345 received by the member node 340 may include a packet error in a location where a last network coded packet is located within the multicast packet 345.

In this example, the member node 330 and the member node 340 may receive new network coded packets corresponding to a number of network coded packets that included a packet error, in order to receive the plurality of data packets transmitted by the base station 310.

According to at least one of the present embodiments, the base station 310, and the plurality of member nodes 320, 330, and 340, may use an ACK signal of a complete NACK type, hereinafter referred to as a complete NACK signal.

Each of the plurality of member nodes 320, 330, and 340 may determine whether all N network coded packets are successfully received. Here, N denotes a number of the network coded packets transmitted by the base station 310.

Each of the plurality of member nodes 320, 330, and 340 may feedback a complete NACK signal to the base station 310, when it is determined that all of the N network coded packets are not successfully received.

In this embodiment, the plurality of member nodes 320, 330, and 340 may compete for resources for transmitting a complete NACK signal to the base station 310, in order to transmit the complete NACK signal to the base station 310 in a distributed manner.

For example, each of the plurality of member nodes 320, 330, and 340 may overhear a complete NACK signal transmitted from another member node.

For example, the member node 330 may sense a packet error included in the received multicast packet 335. In addition, the member node 330 may determine that a complete NACK signal transmitted from another member node is not overheard. Accordingly, the member node 330 may transmit feedback that provides a complete NACK signal 336 to the base station 310.

In contrast, the member node 340 may sense a packet error included in the received multicast packet 345, but may also overhear the complete NACK signal 336 transmitted from the member node 330. In this instance, the member node 340 may not transmit a complete NACK signal.

In addition, the member node 320 may not transmit a complete NACK signal, in response to a determination that all the network coded packets are successfully received, without a packet error.

Each of the plurality of member nodes 320, 330, and 340 may transmit feedback that provides a complete NACK signal, when it is determined that all of the N network coded packets are not successfully received and when a complete NACK signal transmitted from another member node is not overheard.

For example, a member node that desires to transmit a complete NACK signal may recognize that a complete NACK signal is already being transmitted by another member node. In this example, the member node may be aware in advance that a retransmission packet is to be transmitted from a base station. In this instance, the member node overhearing the complete NACK signal transmitted by the other member node may not transmit a complete NACK signal to the base station.

Accordingly, the base station and the plurality of member nodes according to the present embodiment may provide technology for minimizing traffic overhead occurring due to feedback signals being transmitted for recognizing a situation requiring retransmission, in transmission of network coding based multicast traffic.

Accordingly, each of the plurality of member nodes 320, 330, and 340 may be equipped with a cooperative transmission system adapted for a protocol using a complete NACK signal. A configuration of the plurality of member nodes 320, 330, and 340 for such a cooperative transmission system will be described with reference to FIG. 7.

Figure 4:
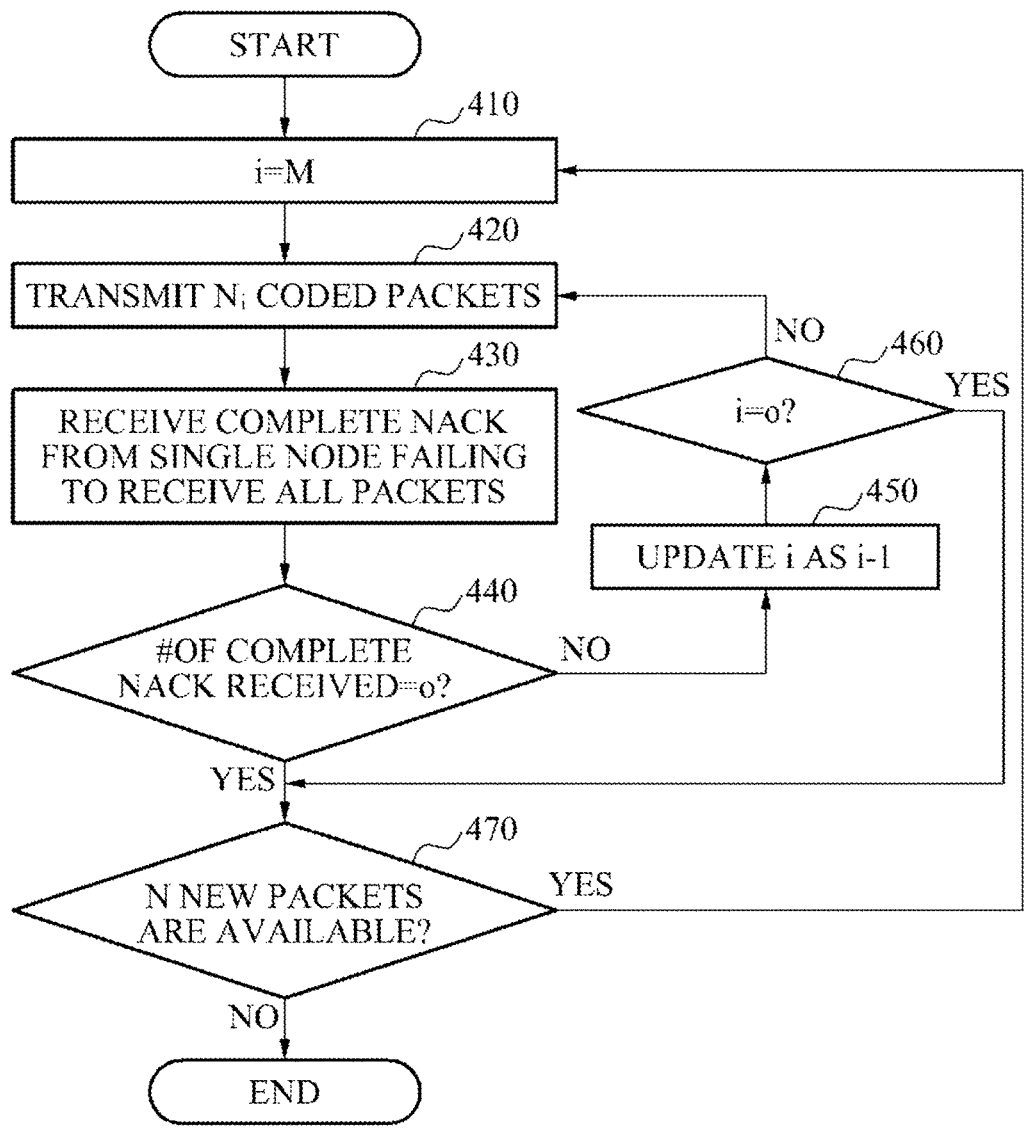
FIG. 4 is a flowchart illustrating an operating method of a base station determining whether a multicast packet is to be retransmitted, using an ACK signal of a complete NACK type according to one or more exemplary embodiments.

FIG. 4 is a flowchart illustrating an operating method of a base station determining whether a multicast packet is to be retransmitted, using an ACK signal of a complete NACK type according to exemplary embodiments.

Referring to FIG. 4, the base station may receive a complete NACK signal from one of a plurality of member nodes, and determine whether the multicast packet is to be retransmitted, based on the received complete NACK signal.

The base station may set a number of network coded packets that are to be included in a retransmission packet to a constant, or may reduce a number of network coded packets to be included in the retransmission packet as a number of retransmissions increases.

In particular, in operation 410, the base station may designate a transmission index i as a maximum number M of retransmissions, when N data packets to be transmitted to K member nodes are available.

In operation 420, the base station may generate $N_i$ network coded packets by network coding the N data packets, and may transmit a multicast packet including the $N_i$ network coded packets to the K member nodes.

Here, $N_M$ denotes a number of network coded packets for an initial transmission of the N data packets, and $N_M=N$. As another example, $N_M$ may be calculated by $\alpha \times N(0<\alpha \leq 1)$.

Each of the K member nodes may receive the multicast packet transmitted from the base station, and sense whether a packet error is present in the received multicast packet. In addition, each of the K member nodes may overhear complete NACK signals transmitted from another member nodes.

Each of the K member nodes may sense a packet error in the received multicast packet, and may provide feedback of a complete NACK signal to the base station when complete NACK signals from other member nodes are not overheard. In operation 430, the base station may receive the complete NACK signal.

In operation 440, the base station may determine whether a received complete NACK signal is present. In this instance, the base station may use an energy detector to determine whether the complete NACK signal is received. As another example, similar to a complete ACK signal, the base station may use a counter to count a number of received complete NACK signals, and determine whether a complete NACK signal is received.

According to other example embodiments, the base station may determine whether a complete NACK signal is received for a predetermined time period. In this example, the base station and the plurality of member nodes may share the predetermined time period. For example, the plurality of member nodes may be configured to transmit complete NACK signals for a predetermined time period after a predetermined time elapses from a point in time at which the base station transmits the multicast packet. A common time period may be designated among the plurality of member nodes, or different time periods may be designated for the plurality of member nodes.

In response to a determination that a received complete NACK signal is present, the base station may reduce the transmission index i by "1", in operation 450. The base station may determine whether the transmission index i corresponds to "0", in operation 460.

In response to a determination that the transmission index i does not correspond to "0", the base station may return to operation 420 to perform a retransmission procedure. For example, the base station may repeat operations 420 through 440, using the transmission index i reduced by "1" in operation 450.

In this instance, the base station may generate $N_i$ data packets by network coding N data packets, and transmit a retransmission packet including the network coded packets to the K member nodes.

Here, $N_i$ may be determined by various schemes. As an example, $N_i$ may be calculated by $\alpha \times N(0<\alpha \leq 1)$, irrespective of the transmission index i.

In another exemplary embodiment, $N_i$ may be reduced as a number of retransmissions increases, in particular, as the transmission index i decreases. For example, when the maximum number M of retransmissions corresponds to "3", $N_i$ may be determined to be $N_3=10$, $N_2=5$, $N_1=3$, and the like.

According to another exemplary embodiment, $N_i$ may be determined based on the number of the received complete NACK signals. For example, when a relatively great number of complete NACK signals are received, $N_i$ may be determined to be a value greater than $N_i$ for a case in which a relatively small number of complete NACK signal are received.

Each of the K member nodes may determine whether the N network coded packets are received, based on the previously received multicast packet and a newly received retransmission packet.

Each of the K member nodes may transmit feedback that provides a complete NACK signal to the base station, in response to a determination that the N network coded packets are not successfully received. In this example, each of the K member nodes may transmit feedback that provides the complete NACK signal, when complete NACK signals transmitted from other member nodes are not overheard.

In response to a determination in operation 440 that a received complete NACK signal is absent, the base station may proceed to operation 470 to transmit subsequent N data packets.

In operation 470, the base station may determine whether the subsequent N data packets are available. When the subsequent N data packets are available, the base station may return operation 410 to repeat operations 410 through 470.

When the transmission index i reaches "0" in operation 460, the base station may determine that the retransmission has been performed M number of times corresponding to the maximum number of retransmissions, and proceed to operation 470 to transmit the subsequent N data packets.

Figure 5:
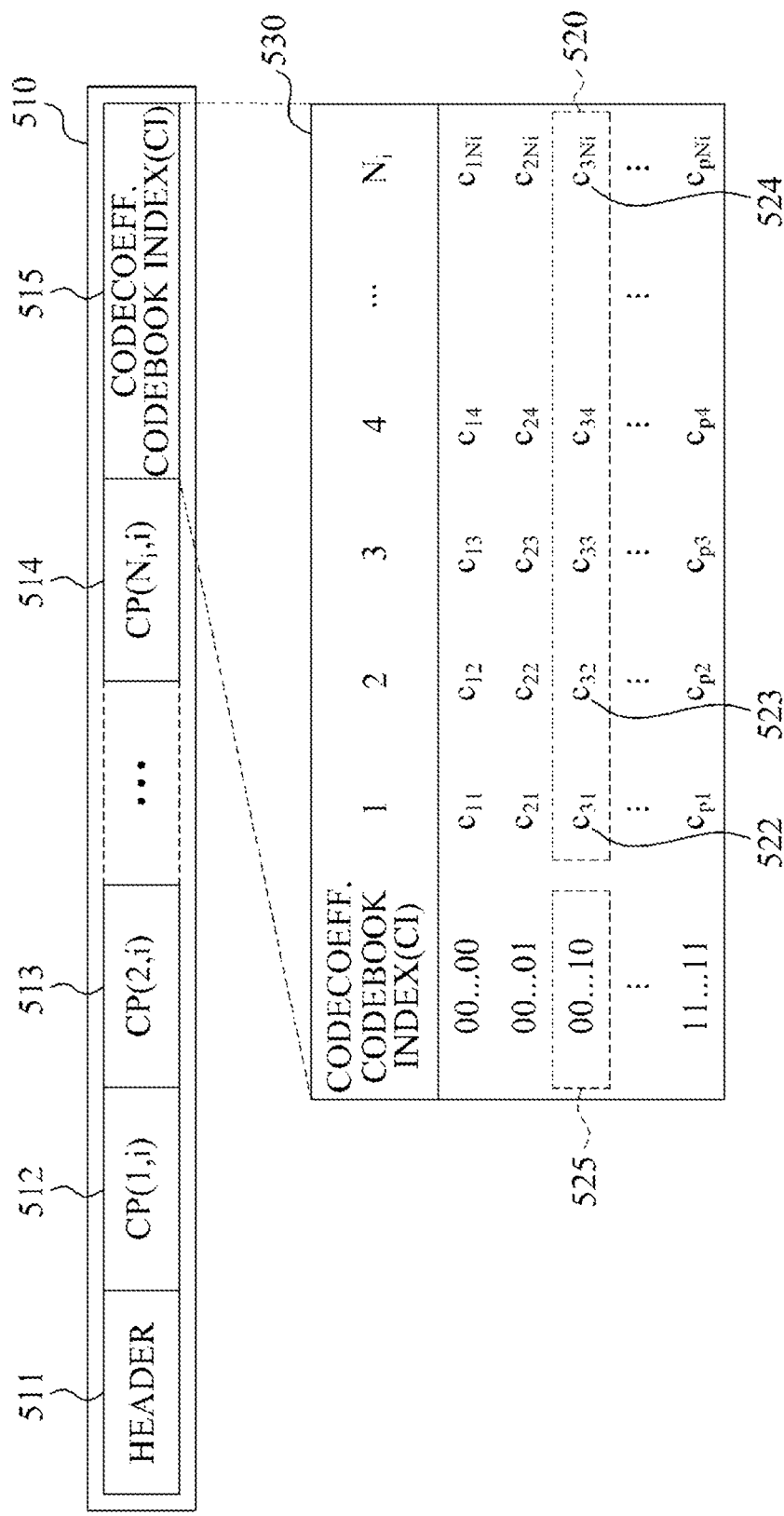
FIG. 5 is a diagram illustrating a structure of a multicast packet network coded using a codebook shared in advance between a base station and member nodes according to one or more exemplary embodiments.

FIG. 5 is a diagram illustrating a structure of a multicast packet 510 network coded using a codebook shared in advance between a base station and member nodes according to exemplary embodiments.

Referring to FIG. 5, the multicast packet 510 may include a header field 511, network coded packet fields 512, 513, and 514, and a codebook index field 515.

The header field 511 may include information related to network coding. The network coded packet fields 512, 513, and 514 may include a plurality of network coded packets generated by network coding a plurality of data packets.

The codebook index field 515 may include a codebook index corresponding to a plurality of code words included in a codebook used when the plurality of data packets is network coded.

The network packet 510 may replace a plurality of random network coding coefficients with the codebook index, thereby providing technology for minimizing feedforward overhead. Here, the plurality of random network coding coefficients may be used for network coding the plurality of data packets, in transmission of multicast traffic.

For example, the base station and the plurality of member nodes according to exemplary embodiments may share, in advance, a codebook 530 including a set of random network coding coefficients, in operation of multicast communication initiation.

Accordingly, the base station and the plurality of member nodes may be aware of a plurality of random network coding coefficients using the codebook index included in the codebook index field 515 of multicast packet 510, each time a data block is transmitted.

For example, the base station may perform network coding using code words 520 corresponding to a codebook index 525, among a plurality of code words included in the codebook 530.

In this example, the base station may generate the network coded packet field 512, by network coding N data packets using a code word 522.

Here, the code word 522 may include N random network coding coefficients, and the base station may generate the network coded packet field 512, by linearly combining the N data packets using the N random network coding coefficients.

Also, the base station may generate the network coded packet field 513, by network coding the N data packets using a code word 523. Similarly, the base station may generate the network coded packet field 514, by network coding the N data packets using a code word 524.

Each of the plurality of member nodes may extract the codebook index 525 included in the codebook index field 515 of the received multicast packet 510. Each of the plurality of member nodes may obtain the code words 520 corresponding to the extracted codebook index 525, among the plurality of code words included in the codebook 530. Each of the plurality of member nodes may decode the network coded packet fields 512, 513, and 514 of the multicast packet 510, using the obtained code words 520.

The method according to the above-described example embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Figure 6:
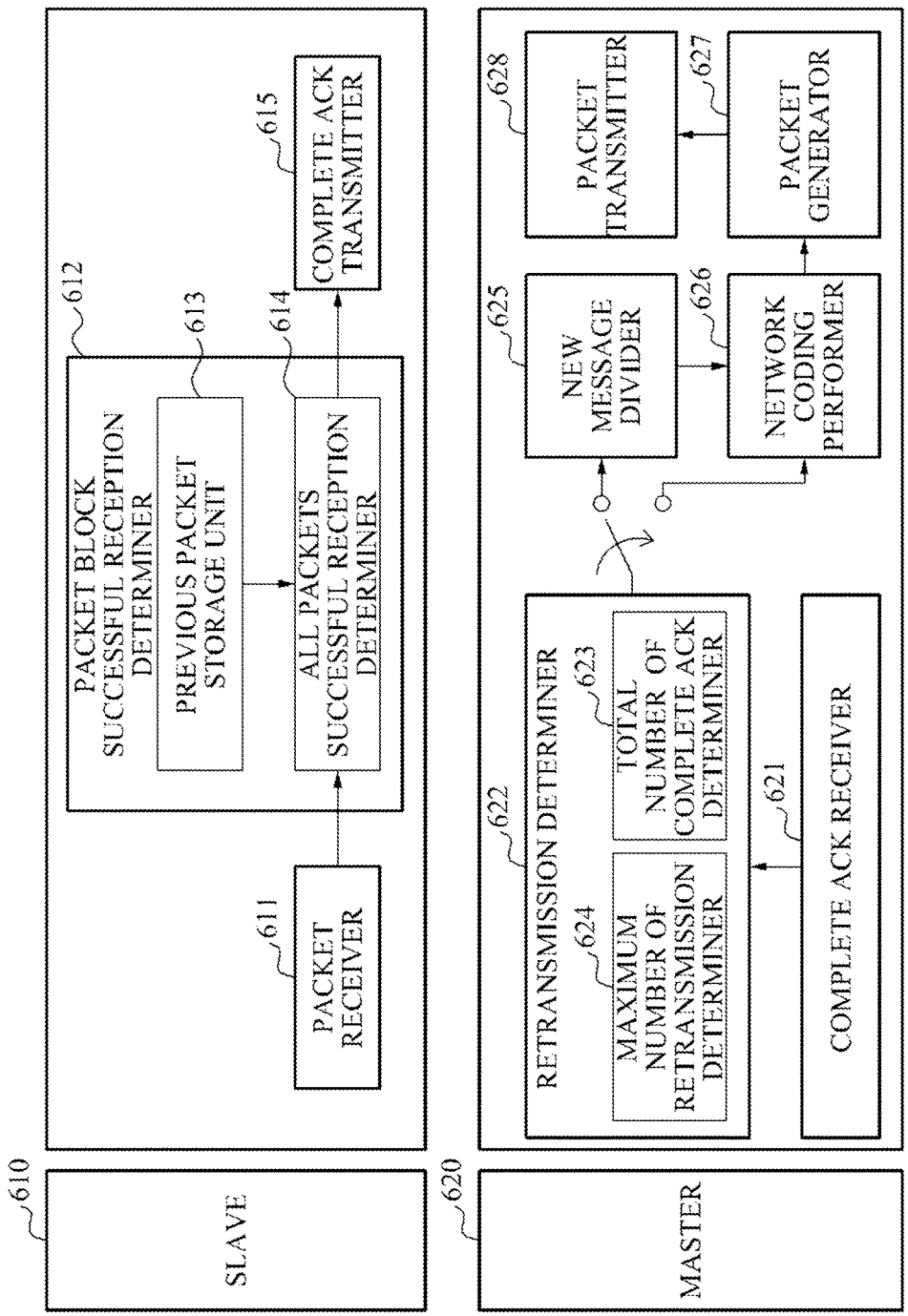
FIG. 6 is a block diagram illustrating a member node and a base station that may determine whether a multicast packet is to be retransmitted, using an ACK signal of a complete ACK type according to one or more exemplary embodiments.

FIG. 6 is a block diagram illustrating a member node 610 and a base station 620 that may determine whether a multicast packet is to be retransmitted, using an ACK signal of a complete ACK type according to one or more exemplary embodiments.

Referring to FIG. 6, the base station 620 may operate as a master, and the member node 610 may operate as a slave.

The member node 610 may include a packet receiver 611, a packet block successful reception determiner 612, and a complete ACK transmitter 615.

The packet receiver 611 may receive a multicast packet transmitted from the base station 620.

The packet block successful reception determiner 612 may include a previous packet storage unit 613, and an all packets successful reception determiner 614. The previous packet storage unit 613 may store a previously received multicast packet or retransmission packet. The all packets successful reception determiner 614 may determine whether a request for retransmission is necessary.

The complete ACK transmitter 615 may transmit complete ACK signal to the base station 620, in response to a determination of the packets successful reception determiner 614 that the request for retransmission is necessary.

The base station 620 may include a complete ACK receiver 621, a retransmission determiner 622, a new message divider 625, a network coding performer 626, a packet generator 627, and a packet transmitter 628.

The complete ACK receiver 621 may receive the complete ACK signal transmitted from the member node 610.

The retransmission determiner 622 may include a total number of complete ACK determiner 623, and a maximum number of retransmission determiner 624. The total number of complete ACK determiner 623 may count a number of complete ACK signals received by the complete ACK receiver 621, and determine that the multicast packet is to be retransmitted, when the number of the received complete ACK signals does not correspond to a number of member nodes included in a multicast group. In addition, the maximum number of retransmission determiner 624 may count a number of retransmissions, and determine that the retransmission is unnecessary, when the number of the retransmissions reaches a maximum number of retransmissions.

The new message divider 625 may prepare subsequent N data packets to be transmitted to the plurality of member nodes, when it is determined by the retransmission determiner 622 that the retransmission is unnecessary.

The network coding performer 626 may network code new N data packets to be transmitted to the plurality of member nodes, or N data packets to be transmitted or retransmitted to the plurality of member nodes.

The packet generator 627 may generate a multicast packet including at least one network coded packet generated by the network coding performer 626. The packet transmitter 628 may transmit the multicast packet generated by the packet generator 627 to the plurality of member nodes.

The descriptions provided with reference to FIGS. 1 through 5 may be applied to each module of FIG. 6 and thus, a detailed description will be omitted for conciseness.

Figure 7:
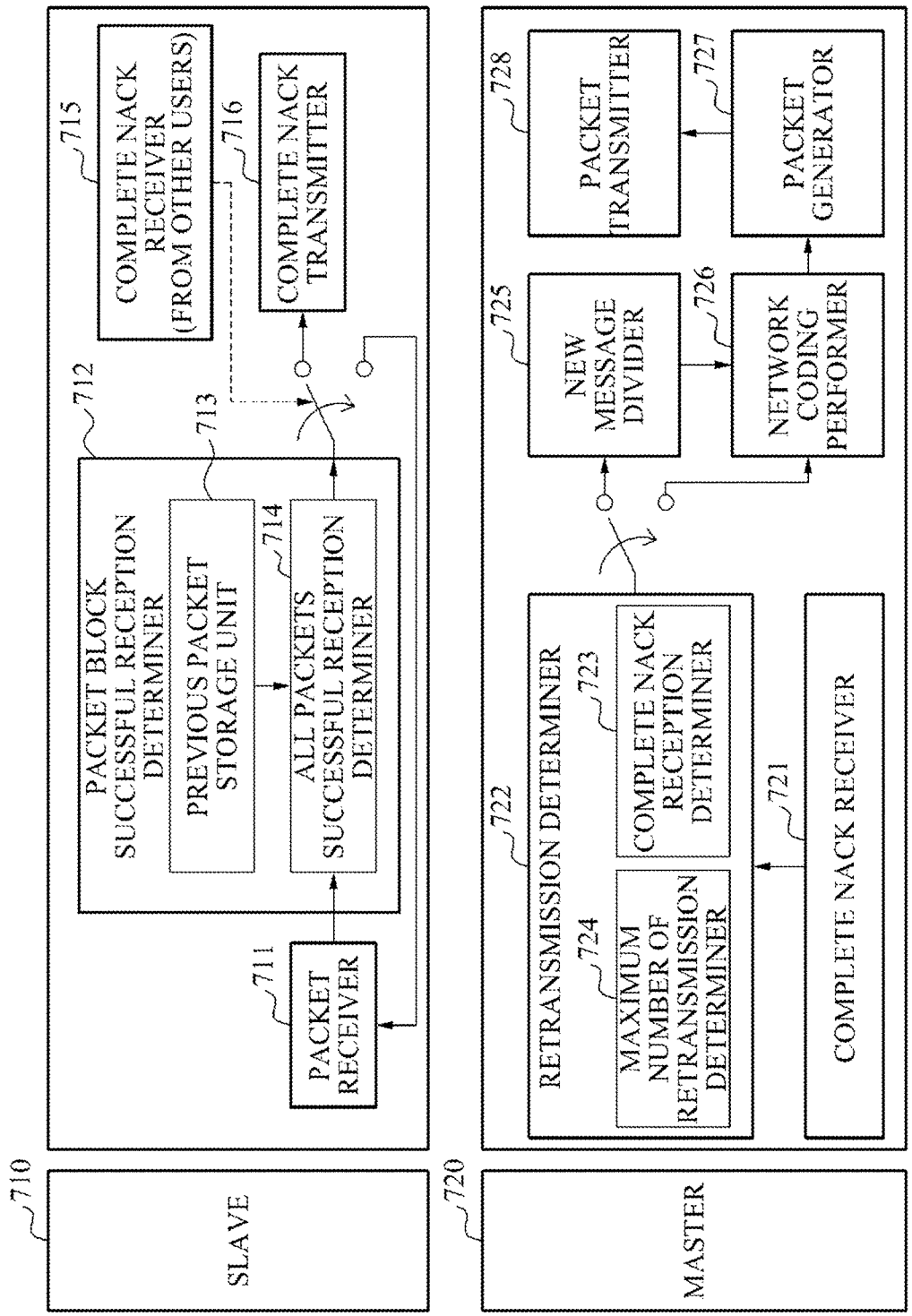
FIG. 7 is a block diagram illustrating a member node and a base station that may determine whether multicast packet is to be retransmitted, using an ACK signal of a complete NACK type according to one or more exemplary embodiments.

FIG. 7 is a block diagram illustrating a member node 710 and base station 720 that may determine whether a multicast packet is to be retransmitted, using an response signal of a complete NACK type according to one or more exemplary embodiments.

Referring to FIG. 7, the base station 720 may operate as a master, and the member node 710 may operate as a slave.

The member node 710 may include a packet receiver 711, a packet block successful reception determiner 712, a complete NACK receiver 715, and a complete NACK transmitter 716.

The packet receiver 711 may receive a multicast packet transmitted from the base station 720.

The packet block successful reception determiner 712 may include a previous packet storage unit 713, and an all packets successful reception determiner 714. The previous packet storage unit 713 may store a previously received multicast packet or retransmission packet. The all packets successful reception determiner 714 may determine whether a request for retransmission is necessary.

The complete NACK receiver 715 may overhear a complete NACK signal transmitted from another member node included in a multicast group.

The complete NACK transmitter 716 may transmit a complete NACK signal to the base station 720, in response to a determination of the all packets successful reception determiner 714 that the request for retransmission is necessary. In this instance, when a complete NACK signal is overheard, by the complete NACK receiver 715, although it is determined by the all packets successful reception determiner 714 that the request for retransmission is necessary, the complete NACK transmitter 716 may not transmit a complete NACK signal to the base station 720.

The base station 720 may include a complete NACK receiver 721, a retransmission determiner 722, a new message divider 725, a network coding performer 726, a packet generator 727, and a packet transmitter 728.

The complete NACK receiver 721 may receive the complete NACK signal transmitted from the member node 710.

The retransmission determiner 722 may include a complete NACK reception determiner 723, and a maximum number of retransmission determiner 724. The complete NACK reception determiner 723 may determine whether a complete NACK signal is received by the complete NACK receiver 721, and determine that retransmission is necessary when a received complete NACK signal is present. The maximum number of retransmission determiner 724 may count a number of retransmissions, and determine that the retransmission is unnecessary when the number of the retransmissions reaches a maximum number of retransmissions.

The new message divider 725 may prepare subsequent N data packets to be transmitted to a plurality of member nodes, when it is determined by the retransmission determiner 722 that the retransmission is unnecessary.

The network coding performer 726 may network code N new data packets to be transmitted to the plurality of member nodes, or N data packets to be transmitted or retransmitted to the plurality of member nodes.

The packet generator 727 may generate a multicast packet including at least one network coded packet generated by the network coding performer 726. The packet transmitter 728 may transmit the multicast packet generated by the packet generator 727 to the plurality of member nodes.

The descriptions provided with reference to FIGS. 1 through 5 may be applied to each module of FIG. 7 and thus, a detailed description will be omitted for conciseness.

Figure 8:
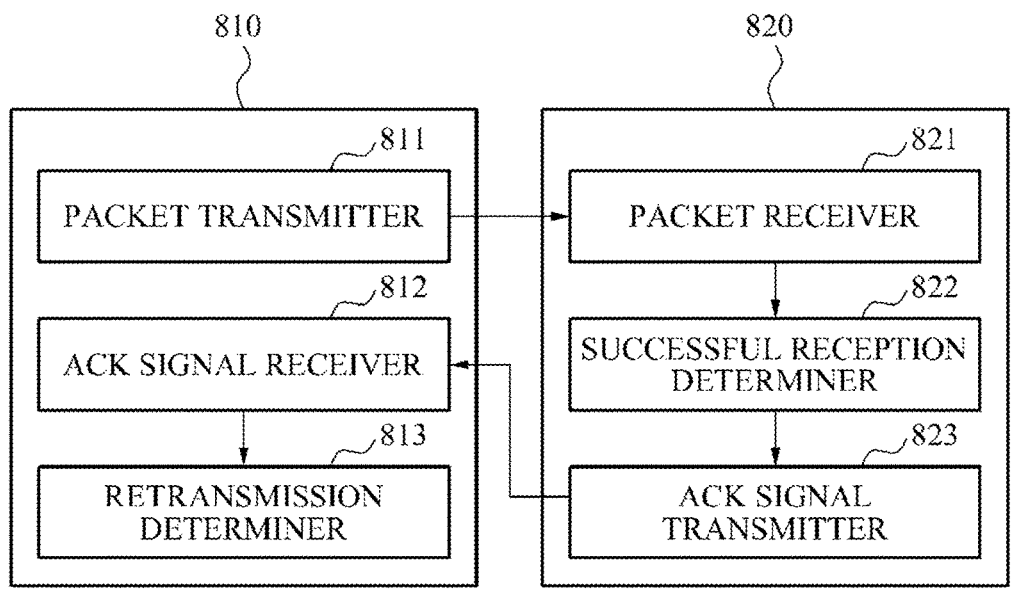
FIG. 8 is a block diagram illustrating a member node and a base station that may determine whether a multicast packet is to be retransmitted, based on an operating mode and a number of ACK signals according to one or more exemplary embodiments.

FIG. 8 is a block diagram illustrating a member node 820 and a base station 810 that may determine whether a multicast packet is to be retransmitted, based on an operating mode and a number of ACK signals according to one or more exemplary embodiments.

Referring to FIG. 8, the base station 810 may include a packet transmitter 811, an ACK signal receiver 812, and a retransmission determiner 813.

The packet transmitter 811 may transmit a multicast packet to a plurality of member nodes belonging to a multicast group. Here, the multicast packet may include a plurality of network coded packets generated by network coding a plurality of data packets.

The ACK signal receiver 812 may receive an ACK signal transmitted from at least one of the plurality of member nodes. The retransmission determiner 813 may determine whether the plurality of data packets is to be retransmitted, based on a number of ACK signals and an operating mode corresponding to a type of the ACK signals.

The member node 820 may include a packet receiver 821, a successful reception determiner 822, and an ACK signal transmitter 823.

The packet receiver 821 may receive the multicast packet transmitted from the base station 810. The successful reception determiner 822 may determine whether the multicast packet is successfully received. The ACK signal transmitter 823 may transmit an ACK signal to the base station 810, based on a result of the determining, and an operating mode corresponding to a type of the ACK signal.

The descriptions provided with reference to FIGS. 1 through 7 may be applied to each module of FIG. 8 and thus, a detailed description will be omitted for conciseness.

Figure 9:
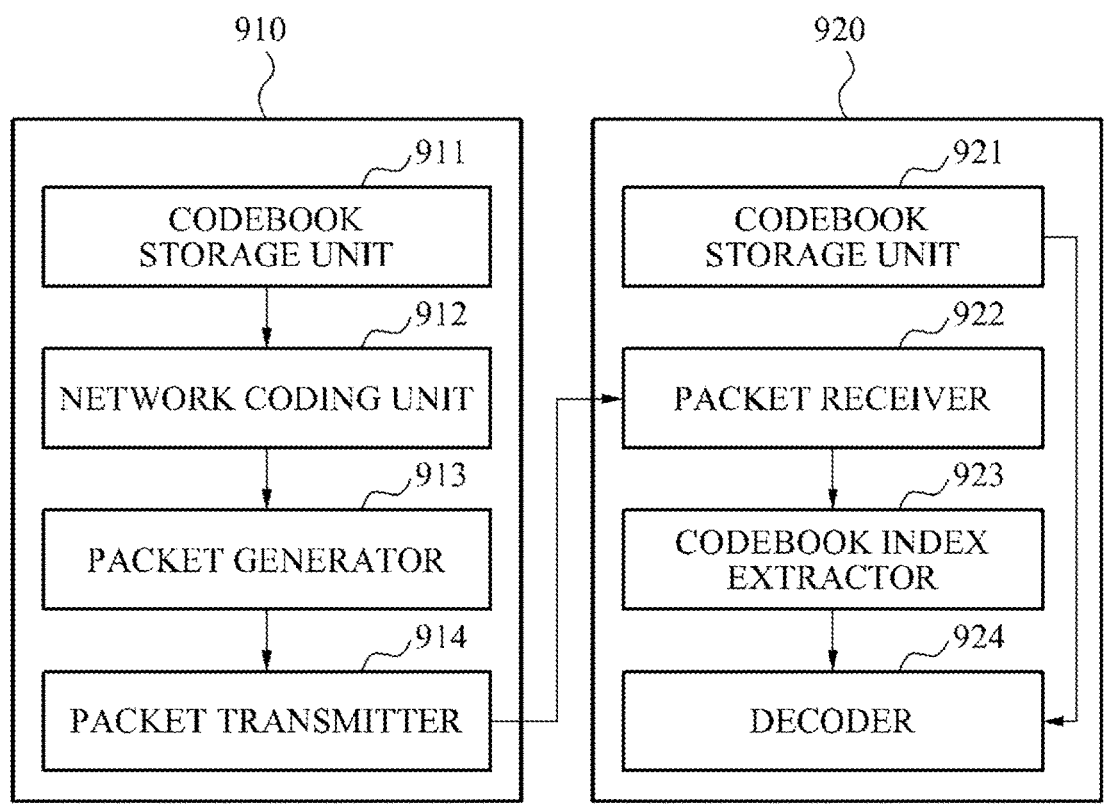
FIG. 9 is a block diagram illustrating a member node and a base station that may transmit a multicast packet network coded using a codebook shared in advance between the base station and member nodes according to one or more exemplary embodiments.

FIG. 9 is a block diagram illustrating a member node 920 and a base station 910 that may transmit a multicast packet network coded using a codebook shared advance between the base station and member nodes according to example embodiments.

Referring to FIG. 9, the base station 910 may include a codebook storage unit 911, a network coding unit 912, a packet generator 913, and a packet transmitter 914.

The codebook storage unit 911 may store a codebook shared with a plurality of member nodes belonging to a multicast group. The network coding unit 912 may generate a plurality of network coded packets by network coding a plurality of data packets using a plurality of code words included in the codebook.

The packet generator 913 may generate a multicast packet including a codebook index corresponding to the plurality of code words and the plurality of network coded packets. The packet transmitter 914 may transmit the multicast packet to the plurality of member nodes.

The member node 920 may include a codebook storage unit 921, a packet receiver 922, a code book index extractor 923, and a decoder 924.

The codebook storage unit 921 may store the codebook shared with the base station 910 and the plurality of member nodes included in the multicast group. The packet receiver 922 may receive the multicast packet from the base station 910.

The codebook index extractor 923 may extract a codebook index from the multicast packet. The decoder 924 may decode the plurality of network coded packets included in the multicast packet, using code words corresponding to the codebook index, among the plurality of code words included in the codebook.

The descriptions provided with reference FIGS. 1 through 7 may be applied to each module of FIG. 9 and thus, a detailed description will be omitted for conciseness.

Although a few example embodiments have been shown and described, example embodiments are not limited thereto. Instead, it would be appreciated by those skilled in the art that changes may be made to these example embodiments without departing from the principles and spirit of the disclosure, the scope of which is defined by the claims and their equivalents.

What is claimed is:

1. An apparatus for transmitting a multicast packet, the apparatus comprising: a processor configured to:
   control a transceiver of the apparatus to transmit a first multicast packet to a plurality of member nodes belonging to a multicast group, the first multicast packet comprising a plurality of network coded packets generated by network coding a plurality of data packets;
   control the transceiver to receive at least one ACK signal transmitted from at least one of the plurality of member nodes;
   determine whether to retransmit at least one of the plurality of network coded packets using a second multicast packet based on the at least one ACK signal;
   determine a number of network coded packets to be included in the second multicast packet based on a number of the at least one ACK signal and a number of previous retransmissions for the plurality of network coded packets in response to determining that at least one of the plurality of network coded packets are to be retransmitted;
   determine a subset of the plurality of network coded packets to be included in the second multicast packet for retransmission;
   generate the second multicast packet comprising the subset of the plurality of network coded packets; and
   control the transceiver to transmit the second multicast packet to the plurality of member nodes, wherein the processor is further configured to determine whether the second multicast packet is to be transmitted based on the at least one ACK signal and an operating mode corresponding to a type of the at least one ACK signal.

2. The apparatus of claim 1, further comprising:
   a memory configured to store a codebook shared with the plurality of member nodes, wherein the processor is further configured to:
   network code the plurality of data packets using a plurality of code words included in the codebook to generate the plurality of network coded packets; and
   generate the first multicast packet comprising the plurality of network coded packets and a codebook index corresponding to the plurality of code words.

3. The apparatus of claim 1, wherein the processor is further configured to:
   count the number of the at least one ACK signal; and
   compare the number of the at least one ACK signal with a number of the plurality of member nodes in response to a type of the at least one ACK signal corresponding to a complete ACK type, and decide the second multicast packet is to be transmitted in response to a result of the comparing, wherein the result of the comparing shows the number of the at least one ACK signal being less than the number of the plurality of member nodes.

4. The apparatus of claim 1, wherein the processor is further configured to:
   count the number of the at least one ACK signal; and
   decide the second multicast packet is to be transmitted in response to at least one of the number of the at least one ACK signal being a type of ACK signal that corresponds to a complete negative acknowledgement (NACK) type.

5. The apparatus of claim 1, wherein the processor is further configured to: determine whether the at least one ACK signal is present; and
   decide the second multicast packet is to be transmitted in response to a determination that the at least one ACK signal is present and a type of the at least one ACK signal corresponds to a complete NACK type.

6. The apparatus of claim 1, wherein the processor is further configured to:
   count the number of the previous retransmissions for the plurality of network coded packets; and
   decide that none of the plurality of network coded packets is to be retransmitted, when the number of the previous retransmissions reaches a predetermined maximum number of retransmissions.

7. The apparatus of claim 1, wherein the processor is configured to be in a receptive state for the at least one ACK signal for a predetermined time period after the first multicast packet is transmitted, and
   wherein the predetermined time period is known by the apparatus and the plurality of member nodes.

8. A member node for receiving multicast traffic from an apparatus, the member node comprising:
   a processor configured to:
   control a transceiver of the member node to receive a multicast packet from the apparatus;
   determine whether the multicast packet is successfully received; and
   control the transceiver to transmit an ACK signal to the apparatus, based on a result of the determining and an operating mode corresponding to a type of the ACK signal,
   wherein the processor is further configured to:
   overhear ACK signals transmitted to the apparatus from a plurality of member nodes included in a multicast group, when a type of the ACK signals corresponds to a complete negative acknowledgement (NACK) type; and
generate an ACK signal of the complete NACK type, in response to a determination that an overheard ACK signal is absent and a determination that the multicast packet is not successfully received.

9. The member node of claim 8, wherein the processor is further configured to generate the ACK signal of a complete ACK type, in response to a determination that the multicast packet is successfully received, when a type of the ACK signal corresponds to the complete ACK type.

10. The member node of claim 8, wherein the processor is further configured to receive a packet retransmitted from the apparatus,
wherein the multicast packet comprises a plurality of network coded packets generated by network coding a plurality of data packets, and
wherein the processor is further configured to determine whether the plurality of data packets are successfully received, based on the retransmitted packet and network coded packets being successfully received from among those originally included in the multicast packet comprising the plurality of network coded packets.

11. The member node of claim 8, further comprising:
a memory configured to store a codebook shared with the apparatus and a plurality of member nodes included in the multicast group,
wherein the processor is further configured to:
extract a codebook index from the multicast packet; and
decode a plurality of network coded packets included in the multicast packet, using code words corresponding to the extracted codebook index, among a plurality of code words included in the codebook.

12. A method for transmitting a multicast packet, comprising:
transmitting a first multicast packet to a plurality of member nodes belonging to a multicast group, the first multicast packet comprising a plurality of network coded packets generated by network coding a plurality of data packets;
receiving at least one ACK signal transmitted from at least one of the plurality of member nodes;
determining whether to retransmit at least one the plurality of network coded packets using a second multicast packet based on the at least one ACK signal;
determining a number of network coded packets to be included in the second multicast packet based on a number of the at least one ACK signal and a number of previous retransmissions for the plurality of network coded packets in response to determining that at least one of the plurality of network coded packets are to be retransmitted;
determining a subset of the plurality of network coded packets to be included in the second multicast packet for retransmission;
generating the second multicast packet comprising the subset of the plurality of network coded packets; and
transmitting the second multicast packet to the plurality of member nodes,
wherein the determining whether to retransmit at least one of the plurality of network coded packets comprises determining whether the second multicast packet is to be transmitted based on the at least one ACK signal and an operating mode corresponding to a type of the at least one ACK signal.

13. The method of claim 12, further comprising:
storing a codebook shared with the plurality of member nodes;
network coding the plurality of data packets using a plurality of code words included in the codebook to generate the plurality of network coded packets; and
generating the first multicast packet comprising the plurality of network coded packets and a codebook index corresponding to the plurality of code words.

14. The method of claim 12, further comprising:
counting the number of the at least one ACK signal; and
comparing the number of the at least one ACK signal with a number of the plurality of member nodes in response to a type of the at least one ACK signal corresponding to a complete ACK type, and deciding the second multicast packet is to be transmitted in response to a result of the comparing, wherein the result of the comparing shows the number of the at least one ACK signal being less than the number of the plurality of member nodes.

15. The method of claim 12, further comprising:
counting the number of the at least one ACK signal; and
deciding the second multicast packet is to be transmitted in response to at least one of the number of the at least one ACK signal being a type of ACK signal that corresponds to a complete negative acknowledgement (NACK) type.

16. The method of claim 12, further comprising:
determining whether the at least one ACK signal is present; and
deciding the second multicast packet is to be transmitted in response to a determination that the at least one ACK signal is present and a type of the at least one ACK signal corresponds to a complete NACK type.

17. The method of claim 12, further comprising:
counting the number of the previous retransmissions for the plurality of network coded packets; and
deciding that none of the plurality of network coded packets is to be retransmitted, when the number of previous retransmissions reaches a predetermined maximum number of retransmissions.

18. The method of claim 12, further comprising:
being in a receptive state for the at least one ACK signal for a predetermined time period after the first multicast packet is transmitted, and
wherein the predetermined time period is known by an apparatus for transmitting the first multicast packet and the plurality of member nodes.

19. A method performed by a member node for receiving multicast traffic from an apparatus, comprising:
receiving a multicast packet from the apparatus;
determining whether the multicast packet is successfully received;
transmitting an ACK signal to the apparatus, based on a result of the determining and an operating mode corresponding to a type of the ACK signal;
wherein the transmitting comprises:
overhearing ACK signals transmitted to the apparatus from a plurality of member nodes included in a multicast group, when a type of the ACK signals corresponds to a complete negative acknowledgement (NACK) type; and
generating an ACK signal of the complete NACK type, in response to a determination that an overheard ACK signal is absent and a determination that the multicast packet is not successfully received.

20. The method of claim 19, further comprising:
generating the ACK signal of a complete ACK type, in response to a determination that the multicast packet is successfully received, when a type of the ACK signal corresponds to the complete ACK type.

21. The method of claim 19, further comprising:
receiving a packet retransmitted from the apparatus, wherein the multicast packet comprises a plurality of network coded packets generated by network coding a plurality of data packets; and
determining whether the plurality of data packets are successfully received, based on the retransmitted packet and network coded packets being successfully received from among those originally included in the multicast packet comprising the plurality of network coded packets.

22. The method of claim 19, further comprising:
storing a codebook shared with the apparatus and a plurality of member nodes included in the multicast group;
extracting a codebook index from the multicast packet; and
decoding a plurality of network coded packets included in the multicast packet, using code words corresponding to the extracted codebook index, among a plurality of code words included in the codebook.

\* \* \* \* \*